3,819,643
ESTERS OF 6-AMINO PENICILLANIC ACID

Erling Kund Frederiksen, Holte, and Wagn Ole Godtfredsen, Vaerlose, Denmark, assignors to Lovens Kemiske Fabrik Produktionsaktieselskab, Ballerup, Denmark
No Drawing. Original application Sept. 26, 1968, Ser. No. 762,987, now Patent No. 3,697,507. Divided and this application Dec. 22, 1971, Ser. No. 211,114
Int. Cl. C07d 99/16
U.S. Cl. 260—306.7      2 Claims

ABSTRACT OF THE DISCLOSURE

The invention comprises antibiotically active new esters of α-aminobenzylpenicillin of the formula:

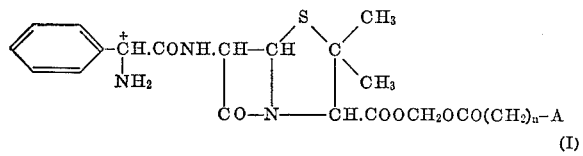

in which the asterisk indicates an asymmetric carbon atom; $n$ is an integer from 0 to 5; and A is an unsubstituted or substituted aliphatic, alicyclic, aromatic, or heterocyclic radical; the salts of said esters with pharmaceutically acceptable acids; and methods of preparing the esters and salts.

---

This is a division of application Ser. No. 762,987, filed Sept. 26, 1968.

This invention relates to a group of new esters of α-aminobenzylpenicillin, these esters having the formula

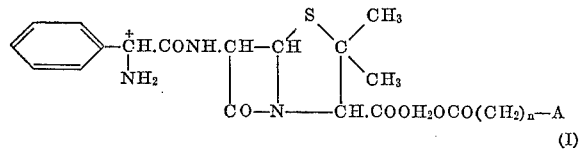

in which the asterisk indicates an asymmetric carbon atom; $n$ is an integer from 0 to 5; and A is an unsubstituted or substituted aliphatic, alicyclic, aromatic, or heterocyclic radical, to salts of these esters with pharmaceutically acceptable acids, and to methods of preparing these new esters.

More particularly, A may represent an aliphatic hydrocarbon radical in which the carbon chain can be straight or branched, saturated or unsaturated, having from 1 to 6 carbon atoms, such as methyl, ethyl, propyl, isopropyl, butyl, sec. and tert. butyl, pentyl, hexyl, and the like; an alicyclic, carbocyclic radical having from 3 to 10 carbon atoms as ring members, and in which the ring or rings may be saturated or may contain one or two double bonds depending on the number of carbon atoms, such as cyclopentyl, cyclohexyl, 1-adamantyl, 1-bicyclo(2.2.2)octyl, cyclopentenyl, cyclohexenyl, in which the double bond may be placed in the 2,3- or 3,4-position, and the like; an aromatic radical such as a monocyclic carbocyclic aryl radical, e.g. a phenyl or substituted phenyl radical, a bicyclic carbocyclic aryl radical, e.g. a 1- or 2-naphthyl or substituted naphthyl radical; a heterocyclic aryl radical, which may contain from 5 to 10 atoms as ring members, such as pyridyl, pyrazinyl, pyrimidyl, thienyl, furyl, or quinolyl, in which the hetero atom may be in any of the available positions, and which may further have substituents in one or more of the remaining positions. As already mentioned, the radical A may have further substituents, such as lower alkyl, e.g. methyl, ethyl, propyl, isopropyl, butyl and the like; lower alkoxy, e.g. methoxy, ethoxy and the like; lower alkylthio, e.g. methylmercapto or ethylmercapto; halo-lower alkyl, e.g. mono-, di- or trifluoromethyl, mono-, di- or trichloromethyl or the ethyl homologues and the corresponding bromo derivatives; halogens, e.g. fluorine, bromine or chlorine; or nitro groups. The substituents may be placed in any possible positions. Salts of the new esters may be formed with inorganic acids, e.g. hydrochloric, hydrobromic, hydroiodic acid and sulphuric acid and the like; and organic acids such as citric, tartaric, maleic acid and the like.

Due to the asymmetric carbon atom in the side chain of the compounds of formula (I), these compounds exist in two epimeric forms, and the invention comprises both of the epimeric forms as well as mixtures thereof. The form, in which the compounds are obtained, depends on which of the epimeric starting materials and which coupling methods are used. The mixtures of the epimeric forms may be separated by fractional crystallization or other known methods.

It is known that the acid-resistant α-aminobenzylpenicillin is a broad-spectrum antibiotic with a widespread use. It is a disadvantage, however, that when orally administered, α-aminobenzylpenicillin is insufficiently absorbed in the organism, and it is one object of the present invention to provide new antibiotically active derivatives of α-aminobenzylpenicillin which, with a view to adequate absorption, distribution in the organism, and the like factors, are superior to α-aminobenzylpenicillin.

Acyloxymethyl esters of some penicillins are known, for instance from Dutch Patent Application No. 6,405,-891, from which it appears that by oral administration such esters are practically not absorbed. An exception is the acetoxymethyl ester of benzylpenicillin, which to some degree is absorbed, giving rise to low but prolonged blood concentrations. It is therefore surprising that the compounds of the invention by oral administration give rise to extremely high concentrations of α-aminobenzylpenicillin in blood and tissues due to an efficient absorption combined with a rapid hydrolysis in the organism.

Table I below shows that the concentrations obtained in the blood and various organs, such as liver, lungs, kidneys and spleen, are considerably higher after administration of the pivaloyloxymethyl ester of D(—)-α-aminobenzylpenicillin than after administration of a corresponding dose of D(—)-α-aminobenzylpenicillin.

TABLE I

Concentrations of D(—)-α-aminobenzylpenicillin in blood and organs from rats after oral administration of—
  A. D(—)-α-aminobenzylpenicillin (100 mg./kg.)
  B. Pivaloyloxymethyl D(—)-α-aminobenzylpenicillinate, HCl (143 mg./kg.) equivalent to 100 mg. of D(—)-α-aminobenzylpenicillin

| | μg. per ml. or per g. wet weight of tissues | | | | | |
|---|---|---|---|---|---|---|
| | ½ hour | | 1 hour | | 2 hours | |
| Organ | A | B | A | B | A | B |
| Blood | 4.1 | 21 | 4.6 | 14 | 1.4 | 2.7 |
| Liver | 20 | 105 | 50 | 135 | 16 | 37 |
| Lungs | 1.3 | 7.9 | 1.1 | 6.5 | 0.56 | 2.0 |
| Kidneys | 21 | 84 | 25 | 67 | 9.6 | 25 |
| Spleen | 0.65 | 2.4 | 0.60 | 2.6 | 0.34 | 0.93 |

Table II below shows the difference in the serum concentrations of benzylpenicillin and D(—)-α-aminobenzylpenicillin, respectively, in dogs following single oral doses of the acetoxymethyl esters of these two penicillins equivalent to 20 mg./kg. body weight of α-aminobenzylpenicillin.

TABLE II
[Serum concentration in μg./ml.]

| Hours after dose | ½ | 1 | 2 | 4 | 6 |
|---|---|---|---|---|---|
| Acetoxymethyl ester of— | | | | | |
| Benzyl-penicillin* | | 0.90 | 0.71 | 0.36 | 0.11 |
| D(—)-β-aminobenzylpenicillin | 2.15 | 10.45 | 7.30 | 1.23 | 0.32 |

*Dutch Patent Application No. 640598.

The same effect is also seen in man.

In Table IIa below, the serum concentrations of D(—)-α-aminobenzylpenicillin after oral administration to normal human volunteers of 75 mg. of the pivaloyloxymethyl ester od. D(—)-α-aminobenzylpenicillin (equivalent to 500 mg. of D(—)-α-aminobenzylpenicillin) are shown as compared with the concentrations obtained after administration of 500 mg. of the D(—)-α-aminobenzylpenicillin. (Ref.: Brit. Med. J., page 198 (vol. II, 1961)). The A figures are obtained as an average volue from 10 persons and the B figures as an average from 7 persons.

TABLE IIa

[Serum concentrations in man μgin ./ml.]

| Hours after administration | ½ | 1 | 2 | 4 |
|---|---|---|---|---|
| A | 6.25 | 9.5 | 4.05 | 1.0 |
| B | 0.74 | 2.7 | 3.8 | 0.88 |

When the esters of formula I are exposed to the influence of enzymes present in the body fluids, or to enzymes produced by microorganisms, e.g. pathogenic micro-organisms, they are readily hydrolysed to α-aminobenzylpenicillin. This hydrolysis is an important feature of the compounds of the invention. It is assumed that the first step consists in an enzymatic hydrolysis by non-specific esterase to the corresponding hydroxymethyl esters of α-aminobenzylpenicillin which subsequently decompose spontaneously to α-aminobenzylpenicillin.

The compounds of formula (I) are well tolerated compounds which may preferably be administered orally either as such or in form of one of their salts, and may be mixed up with a solid carrier and/or auxiliary agents.

In such compositions, the proportion of therapeutically active material to carrier substance and auxiliary agent can vary between 1% and 95%. The compositions can either be worked up to pharmaceutical forms of presentation, such as tablets, pills or dragées, or can be filled in medical containers such as capsules, or as far as mixtures are concerned filled into bottles.

Pharmaceutical organic or inorganic solid or liquid carriers suitable for oral, enteral or topical administration can be used to make up the composition. Gelatine, lactose, starch, magnesium stearate, talc, vegetable and animal fats and oils, gums, polyalkylene glycol, or other known carriers for medicaments are all suitable as carriers.

The preferred salt of the esters is the hydrochloride, but salts with other inorganic or organic acids including antibiotically active acids may be used, e.g. the phosphate, the acetate, the phenoxymethylpenicillin salt, and the like. Furthermore, the compositions may contain other pharmaceutically active components which can appropriately be administered together with the ester in the treatment of infectious diseases, such as other suitable antibiotics.

The favourable high blood levels obtained after oral administration of a single dose of two of the compounds of the invention equivalent to 250 mg. of α-aminobenzylpenicillin appear from table III, in which the figures show the serum concentrations in μg./ml. of the two esters mentioned compared with the α-aminobenzylpenicillin itself.

TABLE III

| Hours | ½ | 1 | 2 | 4 |
|---|---|---|---|---|
| α-Aminobenzylpencillin | 0.7 | 1.6 | 1.8 | 0.8 |
| Acetoxymethyl D(—)-α-amino-benzylpenicillin | 4.5 | 3.3 | 1.7 | 0.6 |
| Pivaloyloxymethyl D(—)-α-aminobenzylpenicillin | 5.0 | 5.9 | 2.2 | 0.5 |

The present invention also includes methods for the preparation of the new esters and their salts. Owing to the presence of the α-amino group of the side chain and the hydrolyzable ester group of the compounds of the invention, certain considerations have to be taken in the preparation.

One method comprises a first step in which an α-substituted benzylpenicillin derivative of the formula (II) is reacted with a compound of formula (III) according to the following scheme:

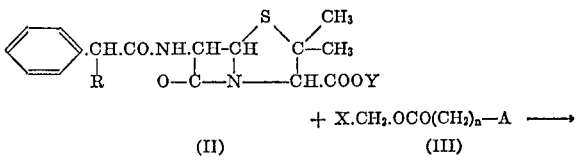

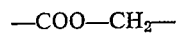

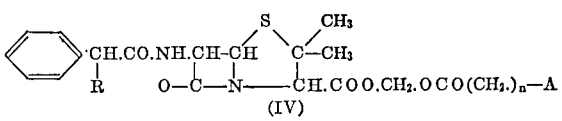

In these formulae, n and A are as defined hereinbefore; R is an amino group, or a substituted amino group Z—NH—, or a group in which can be converted into an amino group, such as an azide or nitro group, or a halogen atom; —COOY and X—CH₂— represent radicals capable of reacting with each other to form the

—COO—CH₂— grouping. As Examples of such radicals, Y may be hydrogen or an alkali metal or a tertiary ammonium group and X may be a halogen atom, preferably chlorine or bromine, an acyloxy radical having from 1 to 16 carbon atoms, or an alkylsulphonyloxy or arylsulphonyloxy radical. The compounds formed by the above-mentioned reaction are esters of α-R-substituted benzylpenicillins (IV). When R is NH₂, formula (IV) represents the compounds of the invention, whereas when R has the other meanings defined above, formula (IV) represents interesting intermediates in the synthesis of the compound of the invention, and as such constitute a part of this invention. As a common characteristic of the substituent R, it can be said that it is selected from groups which after the above reaction are capable of being converted into an amino group by means of methods mild enough to avoid a cleavage of the molecule at the ester group or at the lactam ring. In particularly, the substituent R may have the formula Z—NH— where Z is a benzoyloxycarbonyl radical, a p-halo-, p-nitro-, or p-methoxy-benzyloxycarbonyl radical, α,β,β,β-trichloroethoxycarbonyl or an allyloxycarbonyl radical; or Z is a sulphur-containing radical, such as tritylsulphenyl radical, or an arylsulphenyl radical, e.g. an o-nitrophenylsulphenyl radical; Z may also be a triphenylmethyl (also called trityl) radical, a tertiary butoxycarbonyl radical, or a radical obtained by reacting the free amino group with a β-dicarbonyl compound such as acetylacetone, acetoacetic esters or benzoylacetone to form enamines or Schiff bases. In general, any group represented by Z, which can be split off by reduction, by mild acid hydrolysis or by other mild reactions known per se will be suitable, since experiments have shown, that the esters of formula (I) formed by the reaction in question are stable under such conditions. As examples of R substituents which can be converted into an amino group mention can be made of the azido group, the nitro group and halogen atoms, for instance a bromine atom. The starting compounds of formula (II), in which R is different from NH₂, are known as intermediates in the synthesis of α-aminobenzylpenicillin. They exist in two epimeric forms. If the starting materials are prepared in form of the D or the L epimers, the corresponding epimeric form of the compounds of the invention will be obtained. If, on the other hand, a mixture of the epimeric forms of the starting compound is used, a mixture is obtained. This mixture can be separated in the two epimers, for instance, by fractional crystallization.

The methods of preparing the starting substances of formula (II) are standard procedures employed in peptide chemistry and include, for instance, the conversion of the phenylacetic acid to the R-substituted phenylacetic acid, R having the meaning given before, followed by a reaction between a reactive derivative of this intermediate and 6-amino-penicillanic acid in which the amino group may be free or substituted, for instance with a trimethylsilyl radical. Some of the starting substances of formula (II) can also be prepared from α-aminobenzylpenicillin or salts thereof.

Some of the starting compounds of formula (III) are known compounds, the preparation of which is described in the literature. Others are new, but can be prepared in the same way as the known, using methods which are standard procedures for these types of compounds.

Among such methods may be mentioned the reaction of an acid halide with paraformaldehyde (as described in e.g. J.A.C.S. 43, 660 (1921)) or the halogenation of methyl esters (as described in e.g. Acta Chem. Scand. 20, 1273 (1966) and references cited there).

The reaction of the compounds of formula (II) with the compounds of formula (III) can be performed at or below room temperature or by gentle heating up to the boiling point of the solvent, depending on the meaning of Y and X. Different organic solvents or mixtures thereof with water may be used, for example, acetone, dioxane, tetrahydrofuran, methylene chloride and dimethylformamide. The reaction products are crystalline or oily products, which can be used in the next step without further purification. By repeated reprecipitations, the oily products can be converted into crystalline or amorphous powders.

The subsequent reaction step (IV-I), by which the group R is converted into an amino group, may be effected by different methods known from peptide synthesis, depending on what R stands for.

Catalytic hydrogenation will be preferred when R has the formula Z—NH—, and Z stands for benzyloxycarbonyl and related derivatives thereof, and for trityl. This hydrogenation is preferably performed at room temperature and at atmospheric or slightly elevated pressure in a solvent which may be a non-reducible organic solvent, or a mixture thereof with water. The preferred catalysts are noble metal catalysts, such as palladium or platinum, or Raney-Nickel, but other catalysts can be used as well. Electrolytic reduction can also be used in these cases. When Z stands for a β,β,β-trichloroethyloxycarbonyl group, a reduction with Zn in acetic acid is preferable. A mild acid hydrolysis is preferred in the case where Z stands for a sulphur-containing radical, an enamine or a Schiff base, for instance by means of a dilute solution of hydrogen chloride in aqueous acetone at a pH of about 2. A treatment with formic acid at room temperature is especially suitable for the removal of Z, when Z is a tertiary butoxycarbonyl radical. Also known from the literature is the removal of the o-nitriphenylsulphenyl radical involving a nucleophilic attack on the sulphur atom of the sulphenamide group, the best yield in the present case being obtained with sodium or potassium iodide, sodium thiosulphate, sodium hydrogen sulphide, sodium dithionite, or potassiumthiocyanate. Other sulphenamide radicals can be split off in the same way. If R is an azido or nitro group, or a halogen atom, especially a bromine atom, these may be transformed into the free amino group in known manner, the azido and the nitro group by a catalytic hydrogenation with a noble metal catalyst, or with Raney-Nickel, or by an electrolytic reduction, and the halogen atom by an amination, for instance with hexamethylenetetramine.

Another suitable method for the preparaion of the compounds of the present invention comprises the reaction of a reactive derivative of an α-substituted phenylacetic acid of formula (V) with an ester of 6-aminopenicillanic acid of formula (VI) whereby a product of the above formula (IV) is obtained according to the following scheme:

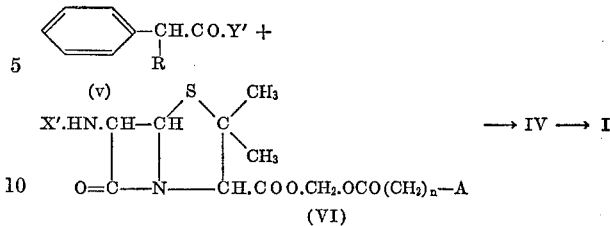

In formula (V) R has the same meaning as in formula (II); in formula (VI) $n$ and A have the same meaning as defined in formula (I); and the radicals —CO—Y' and X'—HN— represent radicals capable of reacting with each other to form a —CO—NH-bridge. For instance —CO—Y' can be the radical of an acid halide, such as an acid chloride or bromide; an anhydride; a mixed anhydride with an alkyl-carbonic acid, such as isobutyl-carbonic acid; a carboxylic acid; an inorganic acid or a sulphonic acid; or a radical obtained by reacting the α-substituted phenylacetic acid with a carbodiimide, or N,N'-carbonyldiimidazole, or a similarly functioning compound; X' can be hydrogen, or a trialkylsilyl group, the alkyl having not more than 5 carbon atoms.

The reaction can be performed in an organic solvent or in a mixture thereof with water either at a low temperature or at slightly elevated temperature. Suitable solvents are methylene chloride, chloroform, ethyl acetate, acetone, dimethylformamide, or dimethylacetamide, ether, tetrahydrofuran, dioxane, or similar inert solvents.

The reaction products are isolated in conventional manner, e.g. by reprecipitation or by removal of the solvent followed by recrystallization from a solvent. The starting compounds of formula (V) are known compounds which can be prepared by standard methods known from the peptide chemistry.

The compounds of formula (VI) are new compounds, which are interesting intermediates in the synthesis of the compounds of formula (I) and as such constitute a part of this invention. They can be prepared by the treatment of 6-amino-penicillanic acid in the form of a salt, such as an alkali metal salt or the triethylammonium salt, with a halomethyl ester of the formula

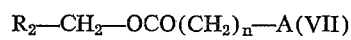

in which $R_2$ is a halogen, preferably a chlorine or bromine atom, or a sulphonyloxy radical, such as methanesulphonyloxy or toluenesulphonyloxy radical, and $n$ and A are as defined above. The 6-amino-penicillanic acid may be used as such, or the 6-amino group may be protected during the esterification process. Only protecting radicals, which can be easily removed without causing any cleavage of the lactam ring or the ester group, are suitable in this case, for instance triphenylmethyl or trimethylsilyl radicals. The reaction is performed in an inert organic solvent such as acetone, dimethylformamide, or methylene chloride, and at or below room temperature, or at slightly elevated temperatures. When the amino group has been protected, the removal of the protecting group can be performed by different methods, such as hydrogenolysis or hydrolysis under neutral or acidic conditions which do not attack the β-lactam ring and the ester group. The reaction products of formula

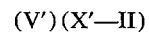

are conveniently isolated as their acid addition salts with, for instance, p-toluenesulphonic acid or other inorganic or organic acids such as sulphuric, phosphoric, hydrochloric, acetic, maleic, tartaric and the like acids.

In another embodiment of the process, the compounds of formula (VI) can be prepared by esterification of any of the industrially accessible penicillins, or preferably their salts, with a compound of the aforementioned formula (VII) under similar conditions as already described, whereafter the side chain of the resulting penicillin ester is split off to yield the 6-amino-penicillanic ester of formula (VI), or a salt thereof.

The cleavage of the amide bond can be performed by a modification of the procedure described in Belgian Patent Specification No. 698,596 by reacting the 6-acylamino-penicillanic acid ester with an acid halide in the presence of an acid-binding agent, such as quinoline or pyridine, and the like. The preferred halide is, however, phosphorus pentachloride, because the reaction in this case can be performed at low temperature increasing the stability of the intermediate formed, which presumably is an imino halide. The reaction can be performed in different solvents, but the preferred ones are chloroform and methylene chloride.

The intermediate is not isolated, but is treated with an excess of a primary alcohol to form an imino ether. The reaction temperature and the reaction time depend on the alcohol used; in most cases temperatures from $-20°$ C. to $+20°$ C. will be convenient.

The imino ether is not isolated, but subjected to an acid alcoholysis of hydrolysis, whereby the C—N bond is cleft to yield the corresponding 6-amino-penicillanic ester of formula (VI). It is surprising that the lactam ring and the acyloxymethyl ester grouping is sufficiently stable under these conditions. By the generally used methods, the esters of 6-amino-penicillanic acid can be isolated from the reaction as such or in the form of a salt with an inorganic or organic acid such as the hydrochloride or the tosylate.

The invention will now be illustrated by the following nonlimiting Examples:

EXAMPLE 1

(A) Acetoxymethyl α-azido-benzylpencillinate

A mixture of potassium α-azido-benzylpenicillinate (2 g.), potassium bicarbonate (0.5 g.), acetoxymethylbromide (1.5 ml.) and acetone (2% water) (20 ml.) was refluxed for one hour. After cooling, the suspension was filtered and the filtrate evaporated in vacuo. The oily residue was washed repeatedly by decantation with petroleumether to yield the desired ester as a gum (2.5 g.) which did not crystallize.

(B) Acetoxymethyl α-amino-benzylpenicillinate hydrochloride

To a solution of acetoxymethyl α-azido-benzylpenicillinate (2 g.) in ethyl acetate (20 ml.) was added a solution of $H_3PO_4$ (980 mg.) and $KH_2PO_4$ (1360 mg.) in water (20 ml.). 10% palladium on carbon catalyst (2 g.) was added, and the resulting mixture was shaken in a hydrogen atmosphere for 2 hours. The catalyst was filtered off, and the phases were separated. The aqueous phase was washed with ether, neutralized (pH 7.5) with aqueous sodium bicarbonate, and extracted several times with ethyl acetate. The combined extracts were washed with water, dried, and evaporated in vacuo. The oily reside was suspended in ethanol (10 ml.), and 2 N ethanolic hydrogen chloride (2.5 ml.) was added with stirring. Addition of ether to the resulting solution precipitated the hydrochloride of acetoxymethyl α-amino-benzylpenicillinate, which was filtered off, washed with ether, and dried. The product thus obtained was a colourless amorphous powder, readily soluble in water, methanol and ethanol, but sparingly soluble in ether and petroleum ether. The purity was determined iodometrically to be 86 percent. The I.R. spectrum (KBr) contains strong bands at:

| | |
|---|---|
| 692 cm.$^{-1}$ | 977 cm.$^{-1}$ |
| 1020 cm.$^{-1}$ | 1195 cm.$^{-1}$ |
| 1300 cm.$^{-1}$ | 1370 cm.$^{-1}$ |
| 1460 cm.$^{-1}$ | 1500 cm.$^{-1}$ |
| 1550 cm.$^{-1}$ | 1687 cm.$^{-1}$ |
| 1765 cm.$^{-1}$ | |

The free base was precipitated from an aqueous solution of the hydrochloride by the addition of aqueous sodium bicarbonate, as a colourless amorphous powder. The N.M.R.-spectrum (CDCl$_3$) of this product shows characteristic signals at $\delta=7.32$ (s), 5.76 (d), 5.53, 4.52, 4.43, 2.08 (s), 1.62 (s), and 1.50 (s), TMS being used as internal reference.

EXAMPLE 2

D(—)-α-amino-benzylpencillin acetoxymethyl ester, hydrochloride

D(—) - α - aminobenzylpenicillin (3.5 g.) and triethylamine (1.42 ml.) were mixed with acetone containing 1 percent of water (70 ml.). To the resulting solution was added potassium bicarbonate (1 g.) and bromomethyl acetate (1.75 ml.), and the mixture was stirred at room temperature for 4 hours. After filtration, the filtrate was concentrated in vacuo to about 15 ml., ethyl acetate (100 ml.) was added, and the resulting solution was washed with aqueous sodium bicarbonate followed by water. Water (30 ml.) was then added to the ethyl acetate solution, and, with vigorous stirring, 1 N hydrochloride acid was added drop by drop until the pH of the aqueous phase was 2.5. The aqueous layer was separated and washed with ether. n-Butanol (150 ml.) was added, and the resulting mixture was evaporated in vacuo until the water was removed. The resulting butanolic solution (40 ml.) was poured into ether (500 ml.) whereby an amorphous precipitate separated. It was filtered off, washed with ether, and dried to yield the hydrochloride of the desired ester as a colourless product, with a purity of 83 percent (determined iodometrically). The I.R. spectrum (KBr) contains bands at:

| | |
|---|---|
| 692 cm.$^{-1}$ | 976 cm.$^{-1}$ |
| 1020 cm.$^{-1}$ | 1195 cm.$^{-1}$ |
| 1300 cm.$^{-1}$ | 1370 cm.$^{-1}$ |
| 1463 cm.$^{-1}$ | 1500 cm.$^{-1}$ |
| 1550 cm.$^{-1}$ | 1690 cm.$^{-1}$ |
| 1765 cm.$^{-1}$ | |

EXAMPLE 3

(A) Acetoxymethyl α-(o-nitrophenylsulphenylamino)-benzylpenicillinate

Acetoxymethyl bromide (1.1 ml.) was added with stirring to a solution of α-(o-nitrophenylsulphenylamino)-benzylpenicillin (5.0 g.) and triethylamine (1.4 ml.) in methylene chloride (45 ml.). The reaction mixture was stirred overnight. Thereafter it was washed with water (25 ml.), aqueous sodium bicarbonate (10 ml.), and water (10 ml.). The organic phase was dried and evaporated in vacuo to yield a gum which was washed by decantation with petroleum ether.

(B) Acetoxymethyl α-aminobenzylpenicillinate hydrochloride

To a solution of the crude acetoxymethyl α-(o-nitrophenylsulphenylamino)-benzylpenicillinate, prepared as described under A above, in 50 ml. of ethyl acetate was added a solution of 2.2 g. of sodium thiosulphate in 50 ml. of water with vigorous stirring. The aqueous phase was separated, extracted with ether, neutralized with aqueous sodium bicarbonate (pH 7.5), and extracted twice with ethyl acetate. The organic phase was dried and evaporated in vacuo leaving an oily residue which was dissolved in ethanol (25 ml.) by the addition of 2 N alcoholic hydrogen chloride (3 ml.) with stirring, and precipitated by addition of ether. The amorphous product was filtered off and washed with ether, yielding the acetoxymethyl α-aminobenzylpenicillinate hydrochloride.

EXAMPLE 4

(A) Acetoxymethyl α-benzyloxycarbonylamino-benzylpenicillinate

A mixture of potassium α-benzyloxycarbonylamino-benzylpenicillinate (2.6 g.), potassium bicarbonate (0.5 g.), acetoxymethyl bromide (1.5 ml.), and acetone (25 ml.) was refluxed for one hour. After cooling, the suspension was filtered and the filtrate evaporated in vacuo. The residue was dissolved in ethyl acetate and extracted with water, aqueous sodium bicarbonate, and water. The organic phase was dried and evaporated in vacuo to yield a gum which was washed by decantation with petroleum ether.

(B) Acetoxymethyl α-aminobenzylpenicillinate hydrochloride

To a solution of orthophosphoric acid (0.98 g.) and potassium dihydrogen phosphate (1.36 g.) in 25 ml. of water was added 10% palladium on barium sulphate catalyst (6 g.) and the suspension was shaken for one hour under hydrogen. A solution of the above-mentioned gum in 25 ml. of ethyl acetate was added and the resulting mixture shaken in a hydrogen atmosphere for 2 hours at room temperature and atmospheric pressure. The catalyst was filtered off, and the aqueous phase separated and washed with ether. The aqueous phase was neutralized (to a pH about 7.5) with aqueous sodium bicarbonate and extracted twice with ethyl acetate. The combined extracts were washed with water, dried and evaporated in vacuo. Thereafter the resulting oily residue was converted to the hydrochloride of acetoxymethyl α-aminobenzylpenicillinate as described in Example 3B.

EXAMPLE 5

(A) Acetoxymethyl D(—)-α-azidobenzyl penicillinate

Potassium D(—)-α-azidobenzylpenicillinate (8.26 g.), potassium bicarbonate (1.0 g.), and bromomethyl acetate (4.1 ml.) were refluxed for one hour in a mixture of acetone (50 ml.) and water (1 ml.).

After cooling, the suspension was filtered, and the filtrate evaporated in vacuo. The residue was washed repeatedly with petroleum ether to remove excess of bromomethyl acetate. The oily residue was taken up in ethyl acetate (50 ml.), and the resulting solution washed with aqueous sodium bicarbonate followed by water. After drying, the solvent was removed in vacuo to yield the desired compound as a gum.

(B) Acetoxymethyl D(—)-α-aminobenzylpenicillinate, hydrochloride

To a solution of acetoxymethyl D(—)-α-azidobenzyl-penicillinate (10.0 g.) in ethyl acetate (150 ml.) were added water (100 ml.) and 10% palladium on carbon catalyst (5 g.) in a flask equipped with an efficient stirrer, a gas inlet tube, a gas outlet tube, a combined glass and calomel electrode, and a burette controlled by an automatic titrator. The system was flushed with nitrogen whereafter a stream of hydrogen was bubbled through the suspension with stirring, a pH value of 3.0 being maintained by addition of 1 N hydrochloric acid via the automatic titrator. When consumption of acid stopped, the flask was flushed with nitrogen until all the hydrogen was removed, and the catalyst was filtered off. The two phases of the filtrate were separated, and the aqueous phase washed with ether and freeze-dried. The desired compound was obtained as a colourless amorphous powder.

The crystalline tosylate of acetoxymethyl D(—)-α-aminobenzylpenicillinate was obtained by adding 0.5 N aqueous sodium p-toluenesulphonate to a 20% aqueous solution of the hydrochloride. The crystalline precipitate which formed was collected, washed with water, and dried to yield colourless crystals, m.p. 166–167° C.

*Analysis.*—Calculated for $C_{26}H_{31}N_3O_9S_2$: C, 52.55; H, 5.26; N, 7.09; S, 10.80%. Found: C, 52.80; H 5.42; N, 6.88; S, 10.64%.

EXAMPLE 6

Acetoxymethyl α-amino-benzylpenicillinate

To a stirred suspension of α - amino - phenylacetyl chloride hydrochloride (340 mg.) and acetoxymethyl 6-aminopenicillinate p-toluenesulphonate (690 mg.) in methylene chloride (8 ml.) at 0° C. was added a solution of triethylamine (0.50 ml.) in methylene chloride (2 ml.). After reaction for one hour at 0° C. and for ½ hour at room temperature, the mixture was evaporated in vacuo and treated with ethyl acetate (20 ml.) and water (25 ml.) containing 4 N hydrochloric acid (0.35 ml.). After shaking, the layers were separated, the ethyl acetate was discharged, and the pH of the aqueous solution was adjusted to 7.5 by the addition of saturated sodium bicarbonate solution (3.5 ml.). The mixture was extracted with ethyl acetate, and the organic layer was dried over magnesium sulphate and evaporated to leave the acetoxymethyl penicillin ester as a viscous oil.

The I.R. spectrum ($CHCl_3$) had bands at 3300 cm.$^{-1}$ (NH), 1875 cm.$^{-1}$ (β-lactam), 1760 cm.$^{-1}$ (ester carbonyl) and 1680 cm.$^{-1}$ (amide). The identity of the compound was demonstrated by conversion of the free base into its hydrochloride and comparison with an authentic sample:

I.R. (KBr):

| 1765 cm.$^{-1}$ | 1687 cm.$^{-1}$ |
| 1550 cm.$^{-1}$ | 1500 cm.$^{-1}$ |

T.L.C.:
$R_F$=0.51 (butanol-ethanol-$H_2O$, 8+2+2)
$R_F$=0.52 (butanol-acetic acid-$H_2O$, 8+2+2)

The acetoxymethyl 6-aminopenicillinate p-toluenesulphonate used as starting material was prepared in the following manner:

Acetoxymethyl 6-aminopenicillinate p-toluenesulphonate (A) Acetoxymethyl 6 - tritylaminopenicillinate.—A solution of 6 - tritylaminopenicillanic acid (11.5 g.) in acetone (65 ml.) was cooled to 0° C., triethylamine (4.2 ml.), was added, followed by acetoxymethyl bromide (2.45 ml.), and the reaction mixture was kept at 0° C. with stirring for 2 hours and fiinally at room temperature for one hour. The triethylammonium bromide (3.5 g.), which precipitated, was removed by filtration, the evaporated filtrate was treated with ethyl acetate (175 ml.), and after 2 washings and cold 2% aqueous $NaHCO_3$, and with ice-water, the ethyl acetate layer was dried over $MgSO_4$ to yield, on evaporation, the desired pure acetoxymethyl ester as an amorphous powder.

*Analysis.*—Calculated for $C_{30}H_{31}N_2O_5S$: C, 67.77; H, 5.87; N, 5.27; S, 6.04%. Found: C, 67.73; H, 5.91; N, 5.22; S, 6.00%.

$[\alpha]_D^{20}$: +109.8 (c.=2; $CHCl_3$).

Thin-layer chromatography (T.L.C.) on silica gel (Merck $HF_{254}$) showed a pure product.

$R_F$=0.71 (butanol-ethanol-$H_2O$, 8+2+2)
$R_F$=0.78 (butanol-acetic acid-$H_2O$, 8+2+2).

(B) Acetoxymethyl 6 - aminopenicillinate, p-toluene-sulphonate.—Acetoxymethyl 6 - aminopenicillinate, (3.71 g.) in acetone (129 ml.) (0.2% $H_2O$) was treated with anhydrous p-toluenesulphonic acid (1.21 g.). After standing for 1½ hours at room temperature, water (0.14 ml.) was added, and precipitation of the p-toluenesulphonate was brought about by addition of petroleum ether (300 ml.). Filtration and consecutive washings with acetone-petroleum ether, ethyl acetate and ether left the crude salt.

After two recrystallizations from acetone-ether, a colourless crystalline product was obtained with a melting point of: 132.5–134° C. (dec.).

Calculated for $C_{18}H_{24}N_2O_8S_2$: C, 46.95; H, 5.25; N, 6.08; S, 13.92%. Found: C, 46.84; H, 5.17; N, 5.86; S, 13.79%.

$[\alpha]_D^{24}$: +127.5° (c.=1; ethanol).
The purity was further established by T.L.C.

$R_F$=0.51 (butanol-ethanol-$H_2O$, 8+2+2)
$R_F$=0.53 (butanol-$CH_3COOH$—$H_2O$, 8+2+2)

Iodometric assay showed 99% purity using 6-aminopenicillanic acid as a standard.

Acetoxymethyl-6-aminopenicillinate, p-toluenesulphonate

6-Aminopenicillanic acid (4.32 g.), dispersed in acetone (140 ml.), was treated with triethylamine (6.3 ml.) with stirring at 0° C. Acetoxymethyl bromide (3.92 ml.) was added dropwise, and the mixture was kept with stirring at room temperature for 4 hours. Triethylammonium bromide (3.5 g.), which formed, was removed by filtration, and was evaporated to dryness in vacuo, then treated with the filtrate ethyl acetate (140 ml.) and cold 2% sodium bicarbonate (110 ml.). After shaking and separation, the ethyl acetate solution was further shaken with ice-water and dried over magnesium sulphate.

On evaporation, 5.2 g. of product were obtained. The crude ester, dissolved in acetone (200 ml.), was treated with anhydrous p-toluenesulphonic acid (3.5 g.) and the p-toluenesulphonate was precipitated by adding ether (750 ml.). It was collected by filtration and washed with ethyl acetate and ether to yield the desired compound.

The complete identity with the product obtained above was demonstrated by comparing melting points, I.R. spectra and T.C.L. data. I.R. (KBr) showed strong bands at:

| | |
|---|---|
| 1785 cm.$^{-1}$ | 1758 cm.$^{-1}$ |
| 1379 cm.$^{-1}$ | 1325 cm.$^{-1}$ |
| 1225 cm.$^{-1}$ | 1170 cm.$^{-1}$ |
| 1123 cm.$^{-1}$ | 1030 cm.$^{-1}$ |
| 1006 cm.$^{-1}$ | 972 cm.$^{-1}$ |
| 811 cm.$^{-1}$ | 681 cm.$^{-1}$ |

EXAMPLE 7

Acetoxymethyl α-azido-benzylpenicillinate

Acetoxymethyl 6 - aminopenicillanat p - toluenesulphonate (580 mg.) was added to a mixture of ethyl acetate (50 ml.) and 2% aqueous sodium bicarbonate (50 ml.). α-Azido-α-phenylacetyl chloride (250 mg.) dissolved in benzene (5 ml.) was added to the mixture with vigorous stirring at 0° C. After ½ hour, the ethyl acetate layer was shaken with ice-water, dried over magnesium sulphate and evaporated in vacuo to give the desired compound.
I.R. (KBr):

2125 cm.$^{-1}$ (azido group)
1780 cm.$^{-1}$ (β-lactam)
1765 cm.$^{-1}$ (ester carbonyl)
1690 cm.$^{-1}$ (amide).

EXAMPLE 8

Acetoxymethyl α-azido-benzylpenicillinate

Acetoxymethyl 6-aminopenicillanate, p-toluenesulphonate (600 mg.) was shaken with a mixture of ethyl acetate (35 ml.) and cold 2% sodium bicarbonate (17 ml.), the layers were separated, and the ethyl acetate solution was further shaken with ice-water (20 ml.), then dried over magnesium sulphate, and evaporated to leave the free acetoxymethyl ester (360 mg.). This was dissolved in methylene chloride (8 ml.), N,N'-dicyclohexylcarbodiimide (255 mg.) was added, and the resulting solution was added quickly with stirring to α-azido-phenylacetic acid (220 mg.) in N,N-dimethylformamide (2.5 ml.) at 0° C. The stirring was continued for one hour at room temperature, and the mixture was filtered over diatomaceous earth "Licalite" (Registered Trademark).

The volume of the filtrate was reduced in vacuo, ethyl acetate was added (25 ml.), and after shaking with 0.01 N hydrochloric acid and with 2% sodium bicarbonate, the ethyl acetate layer aws dried over magnesium sulphate.

Removal of the solvent at room temperature gave a product which proved identical with the compound obtained according to the procedure of Example 7.

EXAMPLE 9

(A) Propionyloxymethyl D(—)-α-azidobenzylpenicillinate

This compound was prepared analogously to the pivaloyloxymethyl D(—)-α-azidobenzyl penicillinate described in Example 12A, using chloromethyl propionate as the halomethyl ester reagent.

(B) Propionyloxymethyl D(—)-α-aminobenzylpenicillinate, hydrochloride

The compound was prepared by catalytic hydrogenation of propionyloxymethyl D(—)-α-azidobenzylpenicillinate in the same way as described in Example 12B.

The desired compound was obtained as a colourless, amorphous powder, and had a purity of 90% determined iodometrically.

I.R. (KBr): 1780 (shoulder), 1764, and 1690 cm.$^{-1}$.
N.M.R. ($D_2O$): Signals at $\delta$=7.94 (s), 6.25 (d; j=1 c.p.s.), 5.96 (s), 5.71 (s), 5.00 (s), 2.88 (m; j=7 c.p.s.), 1.85 (s), and 1.53 (t; j=7 c.p.s.),
TMS being used as external reference.
$[\alpha]_D^{20}$: +191° C. (c=1 in $H_2O$).

EXAMPLE 10

(A) Butyryloxymethyl D(—)-α-azidobenzylpenicillinate

The compound was prepared from D(—)-α-azidobenzylpenicillin potassium salt and chloromethyl butyrate in a manner analogous with the preparation of pivaloyloxymethyl D(—)-α-azidobenzylpenicillinate described in Example 12A.

(B) Butyryloxymethyl D(—)-α-aminobenzylpenicillinate, hydrochloride

The compound was prepared by catalytic hydrogenation of butyryloxymethyl D(—) - α - azidobenzylpenicillinate, using the method described in Example 12B, and obtained as a colourless, amorphous powder.

The purity of the compound was determined iodometrically to be 90.2%.

I.R. (KBr): Bands at 1780–1775 (shoulder), 1763, and 1688 cm.$^{-1}$.
N.M.R. ($D_2O$): Signals at $\delta$=7.94 (s), 6.25 (d; j=1.5 c.p.s.), 5.97 (s), 5.73 (s), 5.00 (s), 2.82 (t; j=5.5 c.p.s.), 2.04 (m; 7.5 c.p.s.), 1.83 (s), and 1.34 (t; j=7.5 c.p.s.), TMS was used as external reference.
$[\alpha]_D^{20}$: +197° C. (c.=1 in $H_2O$).

EXAMPLE 11

(A) Isobutyryloxymethyl D(—)-α-azidobenzylpenicillinate

This compound was prepared from potassium D(—)-α-azidobenzylpenicillinate and chloromethyl isobutyrate in the same manner as described in Example 12A for the preparation of pivaloyloxymethyl D(—)-α-azidobenzylpenicillinate.

(B) Isobutyryloxymethyl D(—)-α-aminobenzyl penicillinate

The compound was obtained as a colourless, amorphous powder by the catalytic hydrogenation of isobutyryloxymethyl D(—)-α-azidobenzylpenicillinate, using the method described in Example 12B. The compound had a purity of 92.6% determined iodometrically.

I.R. (KBr): Bands at 1780 (shoulder), 1760–1755, and 1690 cm.$^{-1}$.
N.M.R. ($D_2O$): Signals at $\delta$=7.94 (s), 6.27 (d; j=1.5 c.p.s.), 5.98 (s), 5.71 (s), 5.01 (s), 3.09 (m; j=7 c.p.s.), 1.82 (s), 1.57 (d; j=7 c.p.s.), TMS was used as external reference.

$[\alpha]_D^{20}$, +196° (c.=1 in $H_2O$).

EXAMPLE 12

(A) Pivaloyloxymethyl D(—)-α-azidobenzylpenicillinate

To a suspension of potassium D(—)-α-azidobenzylpenicillinate (4.14 g.) and potassium bicarbonate (1.5 g.) in acetone (100 ml.) and 10% aqueous sodium iodide (2 ml.), chloromethyl pivalate (2.7 ml.) was added and the mixture refluxed for 2 hours. After cooling, the suspension was filtered and the filtrate evaporated to dryness in vacuo. The remaining residue was washed repeatedly by decantation with petroleum ether to remove unreacted chloromethyl pivalate. The oily residue was taken up in ethyl acetate (100 ml.), and the resulting solution washed with aqueous sodium bicarbonate and water, dried and evaporated in vacuo to yield the desired compound as a yellowish gum, which crystallized from ether. M.P. 114–115° C. $[\alpha]_D^{20}$: +42° (c.=1, $CHCl_3$).

The I.R. Spectrum (KBr) contained strong bands at: 2130, 1786, 1760, 1700, 1530, 1225, 1110 and 973 cm.$^{-1}$.

(B) Pivaloyloxymethyl D(—)-α-aminobenzylpenicillinate, hydrochloride

To a solution of pivaloyloxymethyl D(—)-α-azidobenzylpenicillinate (prepared as described above) in ethyl acetate (75 ml.) a 0.2 M phosphate buffer (pH 2.2) (75 ml.) and 10% palladium on carbon catalyst (4 g.) were added, and the mixture was shaken in a hydrogen atmosphere for 2 hours at room temperature. The catalyst was filtered off, washed with ethyl acetate (25 ml.) and phosphate buffer (25 ml.), and the phases of the filtrate were separated. The aqueous phase was washed with ether, neutralized (pH 6.5–7.0) with aqueous sodium bicarbonate, and extracted with ethyl acetate (2× 75 ml.). To the combined extracts, water (75 ml.) was added, and the pH adjusted to 2.5 with 1 N hydrochloric acid. The aqueous layer was separated, the organic phase extracted with water (25 ml.), and the combined extracts were washed with ether, and freeze-dried. The desired compound was obtained as a colourless, amorphous powder, soluble in water, methanol and ethanol.

The IR-spectrum (KBr) contained bands at 1780 (shoulder), 1765–1775, and 1960 cm.$^{-1}$.

The NMR-spectrum ($D_2O$) showed signals at δ=7.94 (s); 620(m); 5.94(s); 5.78(s); 4.96(s), 179(s), and 1.55(s), TMS being used as external reference.

$[\alpha]_D^{20}$: +195° (c.=1 in $H_2O$).

The purity of the compound was determined iodemetrically to be 91%. A crystalline hydrochloride was obtained from isopropanol with a melting point of 155–156° C. (dec.). $[\alpha]_D^{20}$: +196° (c.=1 in $H_2O$).

EXAMPLE 13

Pivaloyloxymethyl 6-aminopenicillanate, p-toluenesulphonate

To a stirred solution of triethylammonium 6-tritylaminopenicillanate (5.6 g.) in acetone (25 ml.) at 0° C. was added triethylamine (1.08 ml.) followed by chloromethyl pivalate (1.6 ml.) and triethylammonium iodide (2.3 g.). Stirring was continued at 0° C. for ½ hour and at room temperature for 20 hours. The precipitate of triethylammonium chloride was removed by filtration, and the evaporated filtrate was treated with ethyl acetate (75 ml.). After shaking with cold 1% aqueous $NaHCO_3$ and with ice-water, the ethyl acetate layer was separated, dried over $MgSO_4$ and evaporated in vacuo to leave the pivaloyloxymethyl ester of 6-tritylaminopenicillanic acid as an amorphous powder. To the crude ester, dissolved in ethyl acetate (40 ml.) was added a solution of p-toluenesulphonic acid, hydrate (1.90 g.) in ethyl acetate (20 ml.) at 0° C. After additional stirring for 2 hours at room temperature, the precipitate of the desired tosylate was collected on a filter and washed with ethyl acetate and ether.

Recrystallization from acetone-ether afforded the pure crystalline compound with a melting point of 138–39° C. (dec.).

Analysis.—$C_{21}H_{30}N_2O_8S_2$ requires: C, 50.18; H, 6.01; N, 5.57; S, 12.76%. Found: C, 50.46; H, 6.15; N, 5.36; S, 12.57%.

$[\alpha]_D^{24}$: +131° (c.=1; ethanol).

I.R. (KBr) had strong bands at 1795, 1768, 1750, 1545, 1485, 1465, 1375, 1365, 1315, 1210, 1160, 1115, 1030, 980, 815 and 680 cm.$^{-1}$.

Iodometric assay, using 6-aminopenicillanic acid as reference, showed 99% purity.

The purity of the compound was further demonstrated by thin-layer chromatography (T.L.C.) on silica gel (Merck, $HF_{254}$).

$R_F$=0.66 (n-butanol-ethanol-$H_2O$, 4+1+1)
$R_F$=0.12 (cyclohexane-ethyl acetate, 1+1).

EXAMPLE 14

Pivaloyloxymethyl 6-aminopenicillanate, p-toluenesulphonate

6-Aminopenicillanic acid (4.32 g.), dispersed in acetone (140 ml.) at 0° C., was treated with triethylamine (6.4 ml.). While maintaining stirring at 0° C., chlormethyl pivalate (5.9 ml.) and triethylammonium iodide (4.6 g.) were added, and the stirred mixture was left for 20 hours at room temperature. Triethylammonium chloride (2.9 g.) was removed by filtration, and the evaporated filtrate was worked up according to the procedure described in Example 13 to yield the crude pivaloyloxymethyl ester. This was taken up in ethyl acetate (45 ml.). Treatment with anhydrous p-toluenesulphonic acid (3.4 g.) in ethyl acetate (50 ml.) caused immediate precipitation of the crystalline tosylate which was filtered off and washed with ethyl acetate and ether, yielding a pure colourless material which in every respect proved identical with the analytically pure compound from Example 13.

EXAMPLE 15

Pivaloyloxymethyl 6-aminopenicillanate, p-toluenesulphonate

A dispersion of 6-aminopenicillanic acid (2.16 g.) in acetone (70 ml.) at 0° C. was treated with triethylamine (3.22 ml.) followed by bromomethyl pivalate (3.92 g.) (b.p.: 50–51° C. at 10 mm. Hg) prepared from pivaloyl bromide and paraformaldehyde by a method analogous to the preparation of chloromethyl pivalate described in J.A.C.S. 89, 5442 (1967).

After stirring for 20 hours at room temperature, the precipitate of triethylammonium bromide (1.63 g.) was collected on a filter, and the evaporated filtrate was worked up according to the procedure described in Example 13. The crude pivaloyloxymethyl ester was dissolved in ethyl acetate (45 ml.), and crystallization of its pure tosylate was brought about by addition of anhydrous p-toluenesulphonic acid (1.72 g.) in ethyl acetate (25 ml.). The product, which was isolated after filtration and washings with ethyl acetate and ether, showed complete identity with that of Example 13.

EXAMPLE 16

Pivaloyloxymethyl 6-aminopenicillanate, p-toluenesulphonate

To 6-aminopenicillanic acid (2.16 g.) dispersed in acetone (60 ml.) at 0° C. was added triethylamine (1.8 ml.) followed by an acetone solution (10 ml.) of pivaloyloxymethyl p-toluenesulphonate (3.2 g.). The mixture was stirred for ½ hour at 0° C. and for 20 hours at room temperature. The resulting solution was evaporated in vacuo, and the residue was worked up by the method applied in Example 13. To the crude ester in ethyl acetate (75 ml.) was added anhydrous p-toluenesulphonic acid (1.7 g.) in ethyl acetate (25 ml.). The precipitated crystalline salt after filtration and washings with ethyl acetate proved identical with the compound prepared according to the previous Example 13.

The starting material, pivaloyloxymethyl p-toluenesulphonate, was prepared by reacting the silver salt of p-toluenesulphonic acid with chloromethyl pivalate in dry acetonitrile for 4 days at room temperature. It was obtained with a melting point of 44–44.5° C.

*Analysis.*—$C_{13}H_{18}O_5S$ requires: C, 54.53; H, 6.33; S, 11.20%. Found: C, 54.73; H, 6.31; S, 11.09%.

EXAMPLE 17

Pivaloyloxymethyl 6-aminopenicillanate, p-toluenesulphonate

To a dispersion of 6-aminopenicillanic acid (2.16 g.) and potassium bicarbonate (1.0 g.) in acetone (70 ml.) were added chloromethyl pivalate (1.56 ml.) and potassium iodide (280 mg.). The mixture was stirred and refluxed for 5 hours. Solid material was filtered off, and the acetone solution was evaporated in vacuo. The residue was triturated with ethyl acetate (80 ml.), and, after filtration, the cooled ethyl acetate solution was treated with anhydrous p-toluenesulphonic acid (1.72 g.) in ethyl acetate (40 ml.). The precipitated tosylate was collected on a filter and washed with ethyl acetate and ether. Melting point, I.R. spectrum and T.L.C. data of the colourless crystalline product established the identity with the compound obtained according to previous examples.

EXAMPLE 18

Pivaloyloxymethyl 6-aminopenicillanate, hydrochloride

To a solution of $PCl_5$ (2.1 g.) in 20 ml. of dry, alcohol-free chloroform was added 2.26 ml. of dry quinoline with stirring. The resulting suspension was cooled to −30° C., and 4.0 g. of pivaloyloxymethyl benzylpenicillinate were added. After 30 minutes stirring at −5° C. to −10° C., the solution was cooled to −30° C. and 6.7 ml. of dry n-propanol were added in one portion. The temperature rose to −10° C. to −15° C. The reaction temperature was raised to 0° C. during 15 minutes and kept at this temperature for 30 minutes, whereafter the solution was added to an ice-cold mixture of water (25 ml.) and hexane 40 ml. with stirring. The aqueous phase was separated and the organic phase extracted three times with 25 ml. of ice-cold 1 N HCl. The combined aqueous phases were stirred at 0° C. with 90 ml. of ethyl acetate, the pH being adjusted to 7.5 with $NaHCO_3$. The organic phase was separated, dried and evaporated in vacuo to leave an oil which was dissolved in 50 ml. of isopropanol at 0° C. By addition of 1.75 ml. of an 8 N dry solution of hydrochloric acid in isopropanol with stirring, the desired hydrochloride was precipitated. It was filtered and subsequently washed with isopropanol and ether to give a pure product with a melting point of 156–160° C. (dec.).

*Analysis.*—Calculated for $C_{14}H_{23}ClN_2O_5S$: C, 45.84; H, 6.32; Cl, 9.66; N, 7.63; S, 8.74%. Found: C, 45.60; H, 6.39; Cl, 9.76; N, 7.5; S, 8.83%.

$[\alpha]_D^{20}$: +183° (c.=1; 0.1 N HCl).

I.R. (KBr) had characteristic strong carbonyl bands at 1790, 1767 and 1756 cm.$^{-1}$.

The starting material could be prepared in the following manner:

Pivaloyloxymethyl benzylpenicillinate

To a suspension of potassium benzylpenicillinate (19.0 g.) in 200 ml. of acetone was added chloromethyl pivalate (8.3 ml.) followed by a solution of sodium iodide (1.25 g.) in water (5 ml.). The mixture was refluxed for 5 hours. After cooling, the potassium chloride was removed by filtration. By adding water to the filtrate, the desired compound was obtained as a colourless crystalline product with a melting point of 114–115° C.

*Analysis.*—Calculated for $C_{22}H_{28}N_2O_6S$: C, 58.91; H, 6.30; N, 6.24%. Found: C, 58.82; H, 6.33; N, 6.28%.

$[\alpha]_D^{20}$: +236° (c.=1; methanol).

Thin-layer chromatography on silica gel (Merck $HF_{254}$) showed a pure product.

$R_F$=0.45 (Cyclohexane-ethyl acetate, 1+1).
$R_F$=0.86 (Butanol-ethanol-$H_2O$, 4+1+1).

In a manner analogous with that described in the procedure above, the pivaloyloxymethyl 6-aminopenicillanate was prepared by substituting phenoxymethyl penicillin for benzylpenicillin.

EXAMPLE 19

Pivaloyloxymethyl 6-aminopenicillanate

Pivaloyloxymethyl 6-aminopenicillanate, p-toluenesulphonate (24.0 g.), suspended in ethyl acetate (1.1 l.), was treated with 2% aqueous sodium bicarbonate (760 ml.) with vigorous stirring. The layers were separated, and the ethyl acetic solution was shaken thoroughly with ice-water (600 ml.) with 2% sodium bicarbonate added (25 ml.).

The ethyl acetate layer was dried over anhydrous magnesium sulphate, filtered and evaporated in vacuo. The residue was treated with petroleum ether (200 ml.) (b.p. 50° C.) and crystallization took place on stirring for 2½ hours, yielding the analytically pure ester with a melting point of 60–65° C.

*Analysis.*—$C_{14}H_{22}N_2O_5S$ requires: C, 50.90; H, 6.71; N, 8.48; S, 9.71%. Found: C, 51.15; H, 6.77; N, 8.36; S, 9.63%.

$[\alpha]_D^{20}$: +194° (c.=1; $C_2H_5OH$)
$[\alpha]_D^{20}$: +184° (c.=1; $CHCl_3$).

I.R. (KBr) showed characteristic bands at 3400, 1780, and 1750 cm.$^{-1}$.

EXAMPLE 20

Pivaloyloxymethyl D(−)-α-aminobenzylpenicillinate, hydrochloride

Pivaloyloxymethyl 6-aminopenicillanaic, hydrochloride (7.4 g.) was suspended with efficient stirring in dry, ethanol-free chloroform (100 ml.) at 0° C. Sodium bicarbonate (4.3 g.) was added, followed by D-(−)-α-phenylglycyl chloride, hydrochloride (5.0 g.), prepared according to J. Org. Chem. 31, 897 (1966).

Stirring was maintained for 3 hours at 0° C. The mixture was filtered through diatomaceous earth, and the clear filtrate was evaporated in vacuo. The colourless residue was crystallized from isopropanol-ether, collected on a filter and washed with isopropanol and ether to yield the desired compound in high purity, showing complete identity with the hydrochloride of D-(−)-α-aminobenzylpenicilline pivaloyloxymethyl ester which was obtained according to the procedure described in Example 12B.

EXAMPLE 21

Pivaloyloxymethyl D(−)-α-aminobenzylpenicillinate, hydrochloride

To a solution of potassium N-[1-methyl-2-carbethoxyvinyl]-D(−)-α-amino-α-phenylacetate (155.2 g.; 0.5 mole of the hemihydrate) in ethyl acetate (2 l.), N-methylmorpholine (2.5 ml.) and isobutyl chloroformate (70 ml.) were added at −15° C. with stirring. Potassium chloride separated immediately, and the mixture was kept at −15° C. for 6 minutes. Then an ice-cold solution of pivaloyloxymethyl 6-aminopenicillanate in ethyl acetate (1 l.)—prepared from 251.3 g. of the crystalline p-toluenesulphonate of this compound—was added with stirring, the temperature being kept between −14° C. and −12° C. during the acylation. After stirring for another 10 minutes at low temperature, the cooling bath was removed, and the mixture stirred at room temperature for 30 minutes. Thereafter the mixture was extracted with 0.5 M aqueous sodium bicarbonate (500 ml.), and washed with water (2× 250 ml.). The organic phase was dried, and the solvent removed in vacuo. The yellow oily residue thus obtained was dissolved in acetone (1 l.); water (0.9 l.) was added, and 4 N hydrochloric acid was added drop by drop to the mixture with vigorous stirring. A pH-value of 2.5 was maintained in the mixture during the hydrolysis by using an automatic titrator. The reaction was finished when the consumption of hydrochloric acid ceased after addition of 100–110 ml. (80–88 percent of the theoretical amount). Acetone was removed from the mixture by evaporation in vacuo (bath-temperature about 35° C.), and the remaining aqueous phase was extracted several times with ethyl acetate. After separation of the aqueous layer, the combined ethyl acetate extracts were diluted with petroleum ether (800 ml.) and extracted with water (pH 3; 200 ml.). To the combined aqueous phases (ca. 1.2 l.) sodium chloride (240 g.) was added, and the mixture was shaken vigorously whereafter a yellowish organic layer was separated. The aqueous phase was further extracted with ethyl acetate (200 ml.), and the combined organic phases were dried over magnesium sulphate, filtered, whereafter isopropanol (800 ml.) was added to the filtrate. After concentration of the solution under reduced pressure to about half the volume (bath-temperature about 35° C.), another 800 ml. of isopropanol were added, and the mixture was concentrated in vacuo to about 600–800 ml. Crystalline material separated from the mixture, which was stirred for one hour at room temperature and was kept in the refrigerator overnight. The crystalline material was filtered off, washed with ice-cold isopropanol (100 ml.), and ether (2× 100 ml.), and dried at room temperature to yield the desired compound as colourless crystals, m.p. 155–156° C. (dec.).

$[\alpha]_D^{20}$: +196° (c.=1 in $H_2O$).

EXAMPLES 22–26

By the method of Example 15, acetoxymethyl 6-aminopenicillanate, propionyloxymethyl 6-aminopenicillanate, butyroxymethyl 6-aminopenicillanate, isobutyryloxymethyl 6-aminopenicillanate, and octanoyl-oxymethyl 6-aminopenicillanate were prepared by substituting the corresponding bromomethyl acylate for the bromomethyl pivalate.

EXAMPLE 27

(A) 2-Ethyl-butyryloxymethyl D(—)-α-azidobenzylpenicillinate

The compound was prepared from potassium D(—)-α-azidobenzylpenicillinate and chloromethyl 2-ethylbutyrate in the same manner as described for the preparation of pivaloyloxymethyl D(—)-α-azidobenzylpenicillinate in Example 12A.

(B) 2-Ethyl-butyryloxymethyl D(—)-α-aminobenzylpencillinate, hydrochloride

This compound was prepared by the catalytic hydrogenation of 2-ethylbutyryloxymethyl D(—)-α-azidobenzylpenicillinate using the method described in Example 12B, and was obtained as a colourless amorphous powder having a purity of 86.4% determined iodometrically.

I.R. (KBr): Bands at 1780 (shoulder), 1762, and 1690 cm.$^{-1}$.

N.M.R. ($D_2O$): Signals at $\delta$=7.92(s), 6.22(m), 5.93(s), 5.77(s), 4.96(s), 2.68(m; J=7 c.p.s.), 1.95(m; J=7 c.p.s.), 1.82(s), and 1.25(t; J=7 c.p.s.), TMS was used as external reference.

$[\alpha]_D^{20}$: +176° (c.=1 in $H_2O$).

EXAMPLE 28

(A) Benzyloxymethyl D(—)-α-azidobenzylpenicillinate

To a suspension of potassium D(—)-α-azidobenzylpenicillinate (4.14 g.) in a mixture of acetone (100 ml.) and 10% aqueous sodium iodide (2 ml.), chloromethyl benzoate (2.5 g.) was added, and the mixture refluxed for 6 hours. After cooling, the suspension was filtered and the filtrate evaporated to dryness in vacuo. The residue was washed with light petroleum to remove excess of chloromethyl benzoate, and thereafter dissolved in ethyl acetate (50 ml.). The solution was washed with aqueous sodium bicarbonate followed by water, dried, and evaporated in vacuo to yield the desired compound as a gum.

(B) Benzoyloxymethyl D(—)-α-aminobenzylpenicillinate, hydrochloride

To a solution of benzoyloxymethyl D(—)-α-azidobenzylpenicillinate (5.0 g.) in ethyl acetate (75 ml.) was added water (50 ml.) and 10% palladium on carbon catalyst (3 g.) in a flask equipped with an efficient stirrer, a gas inlet tube, a gas outlet tube, a glass-calomel combination electrode, and a burette controlled by an automatic titrator. The system was flushed with nitrogen whereafter a stream of hydrogen was bubbled through the suspension with stirring, a pH value of 3.0 of the aqueous phase being maintained by addition of 1 N hydrochloric acid via the automatic titrator. When the consumption of acid stopped, the flask was flushed with nitrogen until all hydrogen was removed, and the catalyst was filtered off. The biphasic filtrate was separated and the aqueous phase washed with ether and freeze-dried. The desired compound was obtained as a colourless amorphous powder, easily soluble in water.

$[\alpha]_D^{20}$: +175° (c.=1, $H_2O$).

The N.M.R.-spectrum ($D_2O$) showed signals at $\delta$=7.93 (m)(10 H), 6.29 (m)(2 H), about 5.84 (m)(3 H), 4.90 (s)(1 H), 1.66 (3 H) and 1.54 (3 H), TMS being used as external reference.

The purity of the compound was determined iodometrically to be 92%.

EXAMPLE 29

(A) 2-Methylbenzoyloxymethyl D(—)-α-azidobenzylpenicillinate

This compound was prepared analogous to benzyloxymethyl D(—)-α-azidobenzylpenicillinate, using chloromethyl 2-methylbenzoate instead of chloromethyl benzoate. The chloromethyl 2-methylbenzoate was prepared from paraformaldehyde and 1-methylbenzoyl chloride analogous with the preparation of chloromethyl benzoate described in J.A.C.S. 43, 662 (1921).

(B) 2-Methylbenzoyloxymethyl D(—)-α-aminobenzylpenicillinate, hydrochloride

This compound was prepared by catalytic hydrogenation of 2-methylbenzoyloxymethyl D(—)-α-azidobenzylpenicillinate in the same way as described in Example 28B.

The desired compound was obtained as a colourless, amorphous powder, easily soluble in water. The purity of the compound was determined iodometrically to be 88%.

EXAMPLE 30

(A) 2,6-Dimethylbenzoyloxymethyl D(—)-α-azidebenzoylpenicillinate

The compound was prepared from potassium D(—)-α-azidobenzylpenicillinate and chloromethyl 2,6-dimethylbenzoate as described in Example 28A. The chloromethyl 2,6-dimethylbenzoate was prepared from paraformaldehyde and 2,6-dimethylbenzoylchloride benzoate described in J.A.C.S. 43, 662 (1921).

(B) 2,6-Dimethylbenzoyloxymethyl D(—)-α-amino-
benzylpenicillinate, hydrochloride This compound was prepared by catalytic hydrogenation of 2,6-dimethylbenzoyloxymethyl D(—)-α-azidobenzylpenicillinate in the same way as described in Example 28B. The desired compound was obtained as a colourless, amorphous powder with a purity of 85% determined iodometrically.

EXAMPLES 31–53

Using the method described in Example 28A and B, but substituting the X—$CH_2$—$OCC(CH_2)_n$-A defined in the Table IV below for the chloromethyl benzoate, the corresponding esters of D(—)-α-aminobenzylpenicillin are obtained.

TABLE IV

| Ex. No. | X | n | A | Isolated as— |
|---|---|---|---|---|
| 31 | Cl | 0 | 2,6-dimethoxyphenyl | Hydrochloride. |
| 32 | Cl | 0 | 2-methyl-6-chlorophenyl | Do. |
| 33 | Br | 0 | 3-trifluoromethylphenyl | Hydrobromide. |
| 34 | Cl | 0 | 2-nitrophenyl | Hydrochloride. |
| 35 | Cl | 0 | 2-methylthiophenyl | Citrate. |
| 35 | Br | 0 | 2-thienyl | Hydrobromide. |
| 37 | Br | 0 | 2-furyl | Do. |
| 38 | Br | 2 | do | Do. |
| 39 | Cl | 0 | 2-quinolyl | Hydrochloride. |
| 40 | Cl | 1 | 2-thienyl | Do. |
| 41 | Br | 1 | Phenyl | Tartrate. |
| 42 | Cl | 3 | p-Tolyl | Maleate. |
| 43 | Cl | 0 | 3-pyridyl | Hydroiodide. |
| 44 | Cl | 0 | 4-pyridyl | Hydrochloride. |
| 45 | Cl | 0 | 1-naphthyl | Do. |
| 46 | Cl | 0 | 2-naphthyl | Do. |
| 47 | Cl | 0 | Pyrazinyl | Do. |
| 48 | Cl | 1 | Cyclohexyl | Do. |
| 49 | Cl | 1 | 2-methylcyclopentyl | Do. |
| 50 | Cl | 4 | do | Do. |
| 51 | Cl | 0 | 1-bicyclo[2.2.2]octyl | Sulphate. |
| 52 | Cl | 0 | 1-adamantyl | Hydrochloride. |
| 53 | Cl | 0 | Cyclohexen-2-yl | Do. |

Some of the halomethyl esters used are new compounds, which as mentioned before can be prepared from paraformaldehyde and the corresponding acid halide analogous to the preparation of chloromethyl benzoate described in J.A.C.S. 43, 660 (1921).

The salts obtained according to the last column of Table IV correspond to the acids used to maintain the acidity during the hydrogenation. When e.g. hydrochloric acid is used a hydrochloride is obtained, whereas if e.g. citric acid is used a citrate is obtained.

EXAMPLE 54

Benzoyloxymethyl D(—)-α-aminobenzylpenicillinate, hydrochloride

D(—)-α-aminobenzylpenicillin (3.5 g.) and triethylamine (1.42 ml.) were mixed with acetone containing 1 percent of water (70 ml.). To the resulting solution was added potassium bicarbonate (1 g.) and bromomethyl benzoate (4.0 g.) whereafter the mixture was stirred at room temperature for 4 hours. After filtration, the filtrate was concentrated in vacuo to about 15 ml., ethyl acetate (100 ml.) was added, and the resulting solution was washed with aqueous sodium bicarbonate followed by water. Water (30 ml.) was then added to the ethyl acetate solution, and with vigorous stirring, 1 N hydrochloric acid was added drop by drop until the pH of the aqueous phase was 2.5. The aqueous layer was separated and washed with ether; n-butanol (150 ml.) was added, and the resulting mixture was evaporated in vacuo until the water was removed. The resulting butanolic solution (40 ml.) was poured into ether (500 ml.) whereby an amorphous precipitate separated. It was filtered off, washed with ether and dried to yield the hydrochloride of the desired ester as a colourless product, identical with the compound of Example 28B.

By the methods of Example 19, 20 and 54 the compounds of Table IV can also be obtained.

EXAMPLE 55

Mixture containing pivaloyloxymethyl D(—)-α-aminobenzylpenicillinate, hydrochloride Aluminium monostearate (75 g.) was dissolved in modified coconut oil (4300 g.) by heating to 140° C. After cooling, flavour (15 g.) was added. Saccharose (500 g.) and pivaloyloxymethyl D(—)-α-aminobenzylpenicillinate hydrochloride (175 g.) were mixed, reduced by milling to a particle size of about 10 micron and mixed with the oily solution by means of a high speed stirrer.

A mixture was obtained containing 35 mg. of pivaloyloxymethyl D(—)-α-aminobenzylpenicillinate hydrochloride per ml.

What we claim is:

1. Pivaloyloxymethyl 6-aminopenicillinate and pharmaceutically acceptable salts thereof.

2. Acetoxymethyl 6-aminopenicillinate and pharmaceutically acceptable salts thereof.

References Cited

UNITED STATES PATENTS

| 3,250,679 | 5/1966 | Jansen et al. | 260—239.1 |
| 3,293,242 | 12/1966 | Sjoberg et al. | 260—239.1 |
| 3,385,847 | 5/1968 | Vanderhaegne et al. | 260—239.1 |
| 3,555,011 | 1/1971 | Ekström et al. | 260—239.1 |

NICHOLAS S. RIZZO, Primary Examiner

U.S. Cl. X.R.

265—239.1; 424—271

UNITED STATES PATENT OFFICE
CERTIFICATE OF CORRECTION

PATENT NO. : 3,819,643
DATED : June 25, 1974
INVENTOR(S) : Erling Knud Frederiksen et al It is certified that error appears in the above-identified patent and that said Letters Patent are hereby corrected as shown below:

Column 1, line 8, should read --application filed December 22, 1971, Serial No. 211,114. Claims priority British patent application: 44535/67, filed September 29, 1967; 45600/67, filed October 5, 1967; 48127/67, filed October 23, 1967; 51358/67, filed November 10, 1967; 55489/67, filed December 6, 1967; 00499/68, filed January 3, 1968; 14041/68, filed March 22, 1968; and, 15312/68, filed March 29, 1968.--

Signed and Sealed this

Third Day of August 1976

[SEAL]

Attest:

RUTH C. MASON
Attesting Officer

C. MARSHALL DANN
Commissioner of Patents and Trademarks